United States Patent
Oginski et al.

(10) Patent No.: US 10,883,535 B2
(45) Date of Patent: *Jan. 5, 2021

(54) ROTATABLE CONNECTION WITH LIMITED ROTATIONAL ANGLE

(71) Applicant: ONDAL MEDICAL SYSTEMS GMBH, Hünfeld (DE)

(72) Inventors: Stefan Oginski, Fulda (DE); Ronny Bauditz, Suhl (DE); Andreas Göbel, Eiterfeld (DE); Annika Euler, Hünfeld (DE)

(73) Assignee: ONDAL MEDICAL SYSTEMS GMBH, Hünfeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,233

(22) Filed: Apr. 9, 2019

(65) Prior Publication Data

US 2019/0331161 A1     Oct. 31, 2019

Related U.S. Application Data

(63) Continuation of application No. 15/839,241, filed on Dec. 12, 2017, now Pat. No. 10,253,806, which is a
(Continued)

(30) Foreign Application Priority Data

Apr. 24, 2014   (EP) ..................... 14001480

(51) Int. Cl.
*F16C 11/10*   (2006.01)
*F16M 11/08*   (2006.01)
(Continued)

(52) U.S. Cl.
CPC ............. *F16C 11/10* (2013.01); *F16M 11/08* (2013.01); *F16M 11/2014* (2013.01);
(Continued)

(58) Field of Classification Search
CPC ...... E05D 11/10; E05D 11/1007; F16C 11/10; F16M 13/022; F16M 13/027;
(Continued)

(56) References Cited

U.S. PATENT DOCUMENTS 1,634,922 A   7/1927   Stubblebine et al.
3,133,743 A   5/1964   Mullin
(Continued)

FOREIGN PATENT DOCUMENTS

CN   102762877   2/2016
DE   3808327   9/1988
(Continued)

OTHER PUBLICATIONS

U.S. Appl. No. 16/380,064, filed Apr. 10, 2019, Oginski et al.

*Primary Examiner* — William L Miller
(74) *Attorney, Agent, or Firm* — Workman Nydegger

(57) ABSTRACT

A rotatable connection for a mount device for placement in an operating room includes an adjustable stopping mechanism that can be disposed between a first connection component and a second connection component that is mounted rotatably relative to the first connection component about an axis of rotation. The adjustable stopping mechanism may be adapted to establish at least two different relative rotational angles of the connection components relative to one another or at least two different rotation ranges. The adjustable stopping mechanism includes a rotation lock that can be disposed non-rotatably at the first connection component and a coupling part that can be disposed non-rotatably at the second connection component and that has a form-locking contour for establishing individual rotational angle positions, and may include a stopping device with an integral stop. The stopping device may be non-rotatingly positionable. A support system or mount device are also provided.

18 Claims, 4 Drawing Sheets

Figure 1:
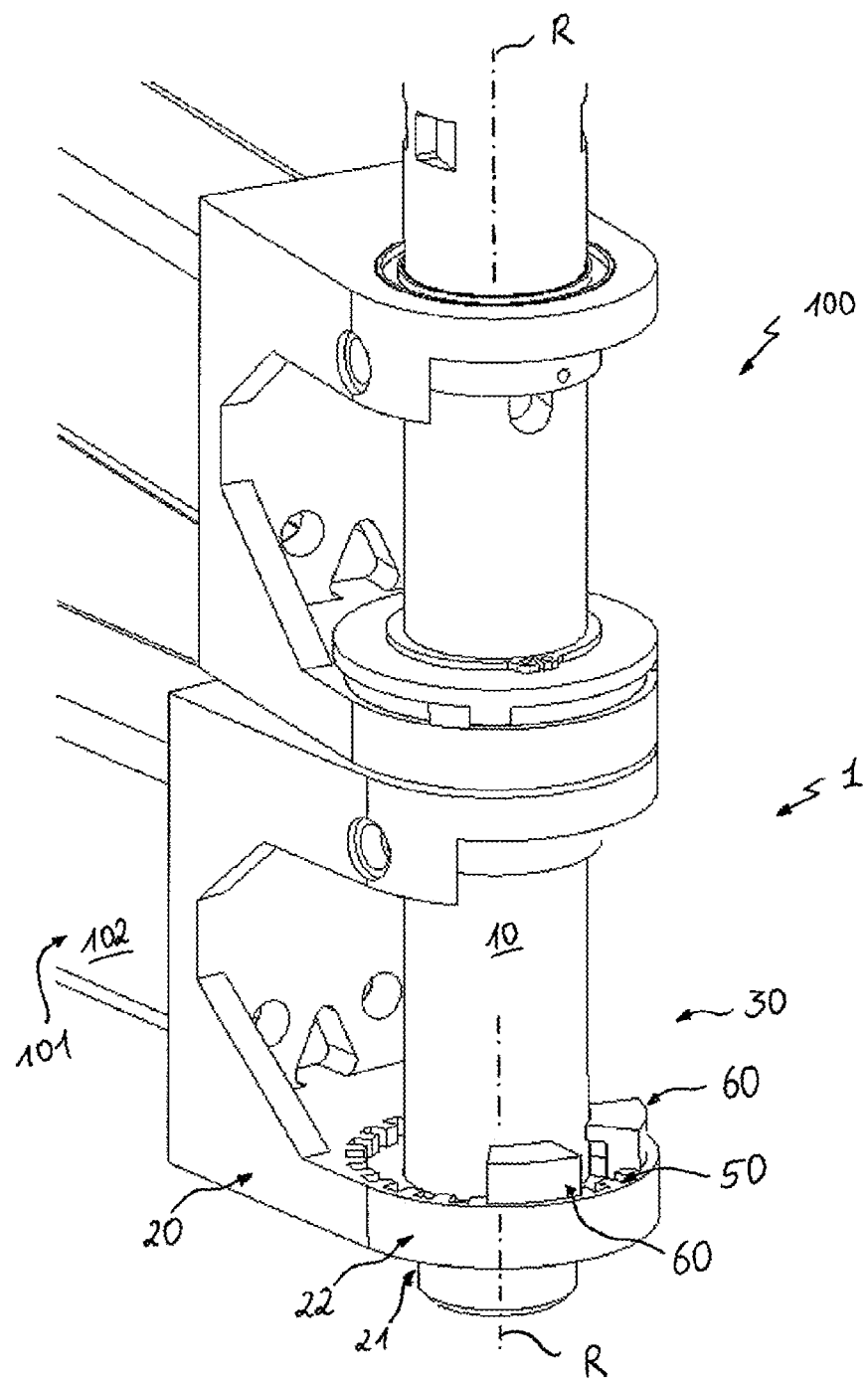

Related U.S. Application Data continuation of application No. 14/695,305, filed on Apr. 24, 2015, now Pat. No. 9,869,343.

(51) Int. Cl.
*F16M 11/20* (2006.01)
*F16M 13/02* (2006.01)

(52) U.S. Cl.
CPC ........ *F16M 13/022* (2013.01); *F16M 13/027* (2013.01); *F16M 2200/024* (2013.01); *Y10T 16/54* (2015.01); *Y10T 16/54028* (2015.01)

(58) Field of Classification Search
CPC ............... F16M 11/2014; F16M 11/08; F16M 2200/024; A61B 19/26; Y10T 16/54; Y10T 16/54028; Y10T 16/551
USPC ..... 16/319, 334, 374; 248/418; 403/112, 83, 403/84, 91, 103
See application file for complete search history.

(56) References Cited

U.S. PATENT DOCUMENTS

| | | | |
|---|---|---|---|
| 3,713,618 A | 1/1973 | Hendrickson et al. | |
| 4,303,135 A | 12/1981 | Benoit | |
| 4,587,908 A | 5/1986 | DeBruyn | |
| 4,673,154 A | 6/1987 | Karapita | |
| 4,772,246 A | 9/1988 | Wenzel | |
| 4,938,094 A | 7/1990 | Cochard | |
| 5,123,768 A | 6/1992 | Franklin | |
| 5,685,661 A | 11/1997 | Marka et al. | |
| 5,720,570 A | 2/1998 | Cole et al. | |
| 6,030,103 A | 2/2000 | Gampe et al. | |
| 6,079,949 A | 6/2000 | Litvin | |
| 6,226,068 B1 | 5/2001 | Arcykiewicz et al. | |
| 6,234,259 B1 | 5/2001 | Kuckes et al. | |
| 6,471,363 B1 | 10/2002 | Howell et al. | |
| 6,633,328 B1 | 10/2003 | Byrd et al. | |
| 6,698,704 B2 | 3/2004 | Kuhn | |
| 6,817,585 B2 | 11/2004 | Wagner et al. | |
| 6,866,410 B2 | 3/2005 | Jesurun et al. | |
| 6,899,442 B2 | 5/2005 | Howell et al. | |
| 7,216,726 B2 | 5/2007 | Swietlik et al. | |
| 7,452,088 B2 | 11/2008 | Brester et al. | |
| 7,455,328 B2 | 11/2008 | Chelchowski et al. | |
| 7,559,518 B2 | 7/2009 | Ye | |
| 7,591,446 B2 | 9/2009 | Istas et al. | |
| 7,635,234 B2 | 12/2009 | Schindler et al. | |
| 7,726,823 B2 | 6/2010 | Rus et al. | |
| 7,753,330 B2 | 7/2010 | Brief | |
| 7,938,205 B2 | 5/2011 | Puttmann | |
| 8,056,874 B2 | 11/2011 | Goodwin et al. | |
| 8,070,331 B2 | 12/2011 | Gull et al. | |
| 8,209,816 B2 | 7/2012 | Heger et al. | |
| 8,262,311 B2 | 9/2012 | Trice | |
| 8,591,444 B2 | 11/2013 | Bejarano et al. | |
| 9,022,339 B2 | 5/2015 | Borg et al. | |
| 9,239,127 B2 | 1/2016 | Kronung | |
| 9,280,037 B2 | 3/2016 | Leblanc et al. | |
| 9,719,560 B2 | 8/2017 | Dreizler | |
| 9,869,343 B2 | 1/2018 | Oginski et al. | |
| 1,024,735 A1 | 4/2019 | Oginski et al. | |
| 1,026,067 A1 | 4/2019 | Oginski et al. | |
| 10,247,352 B2 | 4/2019 | Oginski et al. | |
| 2005/0006542 A1 | 1/2005 | Henning et al. | |
| 2005/0121578 A1 | 6/2005 | Asamarai et al. | |
| 2005/0242261 A1 | 11/2005 | Brahler et al. | |
| 2006/0285915 A1 | 12/2006 | Dellach et al. | |
| 2009/0072106 A1 | 3/2009 | Zheng | |
| 2009/0213596 A1 | 8/2009 | Gull et al. | |
| 2009/0245924 A1 | 10/2009 | Whitling et al. | |
| 2011/0314637 A1 | 12/2011 | Bejarano et al. | |
| 2012/0014744 A1 | 1/2012 | Lin | |
| 2012/0059274 A1 | 3/2012 | Zoth et al. | |
| 2013/0189019 A1 | 7/2013 | Kotula et al. | |
| 2014/0105670 A1 | 4/2014 | Plomteux | |
| 2014/0314538 A1 | 10/2014 | Carter et al. | |
| 2015/0366627 A1 | 12/2015 | Oginski et al. | |
| 2016/0102702 A1 | 4/2016 | Lang et al. | |
| 2016/0102802 A1 | 4/2016 | Oginski et al. | |
| 2016/0281915 A1 | 9/2016 | Bowman et al. | |
| 2017/0304022 A1* | 10/2017 | Oginski ................. | A61B 90/25 |
| 2020/0158278 A1* | 5/2020 | Daugirdas ............ | A61B 6/4441 |

FOREIGN PATENT DOCUMENTS

| | | |
|---|---|---|
| DE | 4306802 | 8/1994 |
| DE | 102008011129 | 8/2009 |
| EP | 0392303 | 10/1990 |
| EP | 0614037 | 3/1994 |
| EP | 1473473 | 9/2006 |
| EP | 2096349 | 9/2009 |
| EP | 2325541 | 5/2011 |
| EP | 2937617 | 10/2015 |
| EP | 2937618 | 10/2015 |
| EP | 2937619 | 10/2015 |
| FR | 1341061 | 10/1963 |

* cited by examiner

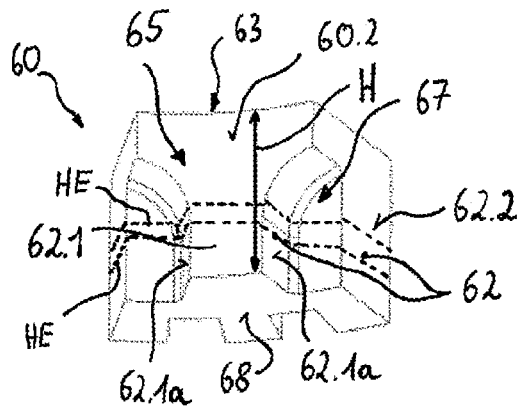
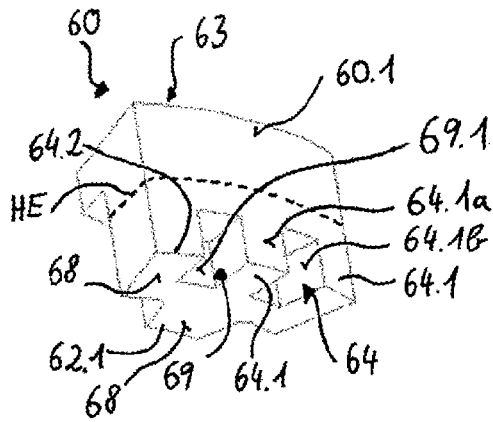
FIG. 4A          FIG. 4B
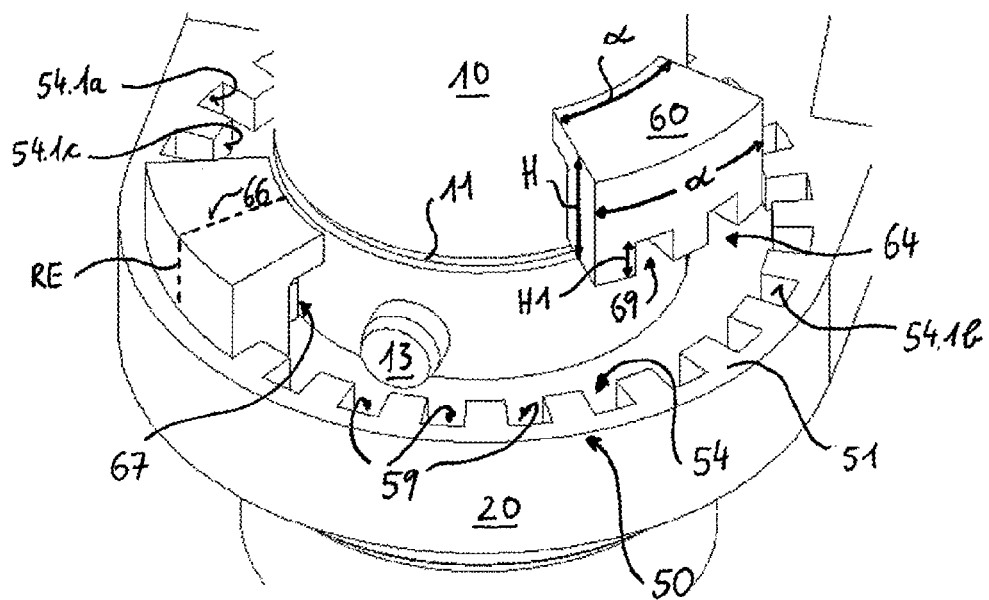
FIG. 5

ROTATABLE CONNECTION WITH LIMITED ROTATIONAL ANGLE

The present invention relates to a rotatable connection for a mount device for placement in an operating room, the connection comprising an adaptable stopping mechanism that can be placed between a spindle and a sleeve that is mounted on an axis of rotation and is rotatable relative to the spindle, the stopping mechanism also being adapted to establish at least two different relative rotational angles of the spindle relative to the sleeve or at least two different rotation ranges, wherein the adaptable stopping mechanism comprises: a rotation lock that can be disposed in the spindle; and a non-rotating coupling part provided on the sleeve, the coupling part having a form-locking contour for establishing individual rotational angle positions. The present invention particularly relates to a rotatable connection that has the individual features of claim 1 and a support system or mount device with individual features of the further corresponding independent claims.

Mounts, in particular ceiling mounts such as ceiling supply units, monitor supports or so-called spring arms or central axes, usually have one or more supports non-rotatingly or height-adjustably disposed relative to a vertical position for moving and positioning a medical device attached to the supports, for example in an operating room, in particular at an intensive care station. Frequently mounted to the mounts are supply units for supplying medical-electrical end devices with the media required during an operation, for example. In the process, the supports define a radius of action for the medical equipment within which the medical equipment can be positioned. The supports can usually be rotated about at least one rotatable connection, in particular a rotating hinge. Alternatively, the supports are also height-adjustable and/or are disposed about an at least approximately horizontal axis and can pivot vertically.

A rotational motion of individual supports, whether absolute rotational movement or rotational movement relative to another support, should in many cases be limited to a prescribed angle. This can, for example, prevent a support from rotating by more than 360° relative to another support, and thereby twisting, pinching or even tearing lines being routed in the support. An example of rotational angle limiting can be a stop which a support abuts at a specific rotational angle, for example 300°. In the process, the stop can be non-rotatingly mounted to the support, for example, in particular in the form of a securing bolt inserted in the radial direction. The stop prescribes a pre-defined rotational angle in the process. This kind of rotational angle limiting can indeed keep a maximum rotational angle from being exceeded, but there is usually the disadvantage that the freedom of movement of the mount is limited. For example, a supply unit in the mount can no longer be placed in any desired position as a result. The radius of action of the mount is limited, in particular regardless of the particulars of the room situation. Therefore, each individual case must be weighed to see which stop can or should be used to define the rotational angle limit. However, correctly designing the rotational angle limit, in particular adequately positioning the stop, can create difficulties in the manufacture of the corresponding mount, particularly when the place where the mount is to be used has not yet been clarified. Therefore, rotational angle limits are made practical in that an rotational angle or a rotational position can be adjusted afterward.

A device with an adjustable rotational angle is known from EP 2 325 541 B1. EP 2 325 541 B1 describes a two-part, adjustable stopping mechanism in which a circular part can be positioned selectively outside about a periphery of a first support or a hinge of the first support, and in which the circular part comprises a plurality of grooves or projections disposed at the end for arranging the circular part in different rotational angle positions relative to the first support in a simple manner. Further disposed at the circular part is a stop at which a second support can stop. The circular part can be used to adjust an rotational angle of the two supports relative to one another. The stopping mechanism is disposed inside of a sleeve of the second support here. The circular part can be raised by way of engagement of a tool in a groove that runs around an outer surface of the circular part, the raising positioning the circular part in a desired rotational angle position relative to the first support.

Furthermore, another circular part that is positionable relative to the circular part is provided at the first support. The two circular parts are disposed inside of the sleeve and are enclosed and covered on the outside radially by the sleeve. Disposed in the sleeve is a securing bolt inserted in the radial direction, the bolt reaching into an intermediate space formed between the two circular parts. The expansion of the intermediate space in the peripheral direction is defined by the relative rotational position of the first circular part relative to the second circular part. The angular range within which the two supports can be rotated relative to one another can be defined by way of the expansion of the intermediate space in the peripheral direction. The stopping mechanism is substantially disposed at the first support in the process, and cooperates with the second support by way of the radially inserted securing bolt.

DE 38 08 327 A1 describes a stopping mechanism in which a threaded bolt can be shifted in the radial direction in a threaded hole so that different rotational angle positions can be established.

One object of the present invention is to provide a rotatable connection for adjusting an rotational angle or rotational (angle) range in a simple manner. In particular, the object also involves providing a mount device comprising a rotational angle limit in which individual supports of the mount device can be positioned within a defined action radius in an operating room thanks to a rotatable connection that can be easily adjusted, or in a flexible manner.

This object is achieved by way of a rotatable connection for a mount device for placement in an operating room, comprising an adjustable stopping mechanism that can be disposed between a first connection component (in particular a connection component of the rotatable connection) and a second connection component that is mounted rotatably relative to the first connection component about an axis of rotation (in particular a connection component of the rotatable connection), the adjustable stopping mechanism being adapted to establish at least two different relative rotational angles of the connection components relative to one another and/or at least two different rotation ranges, wherein the adjustable stopping mechanism comprises: a rotation lock that can be disposed non-rotatingly at the first connection component; a coupling part that can be disposed non-rotatingly at the second connection component and that has a form-locking contour for establishing individual rotational angle positions; wherein the adjustable stopping mechanism comprises at least one stopping device with an integral stop, wherein the stopping device comprises a form-locking contour that corresponds with the form-locking contour of the coupling part, the stopping device being positionable non-rotatingly at the coupling part by means of said stopping device contour in at least two different rotational angle positions in such a way that the integral stop is adapted to cooperate with the rotation lock directly or indirectly by way of an element that couples the rotation lock to the stopping device (directly), in particular a stopping ring, and to establish the different rotational angles or rotation ranges. This provides an adjustable rotatable connection in a simple, and especially flexible manner. The adjustment can be made by way of axial shifting or by re-setting or re-inserting the stopping device, in particular manually. The separate stopping device or plurality of stopping devices, in particular two or three, can be disposed in different rotational positions between the two connection components. In the process, it is possible to establish different rotation ranges, for example one rotation range from compass north (the geographical north direction) to 300° or 330° clockwise and counterclockwise, for example, or a rotation range starting from compass east to 330°, in a very simple manner. This allows the radius of action to be adapted to a mount device relative to an arrangement near the wall or in a corner, for example. In other words, a starting point or beginning point of a specific rotational angle range can be easily adjusted. It is also possible in a simple way to define or adjust an (absolute/maximum) amount of the rotational angle by repositioning, in particular by re-inserting, the stopping device, for example in 15° steps. The integral stop is preferred to be integrally provided at the stopping device, i.e. the stopping device forms a single piece together with the integral stop.

The rotatable connection of the present invention differs from the rotatable connection described in EP 2 325 541 B1 among other things in that the stopping device is mutually rotatable together with the second connection component up to the stop at the rotation lock, whereas the rotatable connection of EP 2 325 541 B1 requires a more complex rotation stop design. In the rotatable connection of EP 2 325 541 B1, the rotation lock is rotated together with the first connection component, which requires that grooves be made in which the rotation lock can be moved. It is preferable for the rotatable connection of the present application to be designed such that the first connection component is fixed and the second connection component is mounted rotatably relative to the first connection component.

By locating the stopping mechanism both at the first connection component and at the second connection component, a stopping device can be provided which can act directly between the two connection components and which can be disposed and repositioned in a simple manner between the two connection components, in particular by way of axial shifting.

The number of components can be kept low with high flexibility and many variation options using a stopping device comprising one or more integral stops. It is preferable for the overall stopping mechanism to consist of only three or four different components, in particular the rotation lock, the coupling part and the stopping device, and alternatively an additional stopping ring as well. Then, at each connection component there can be provided a connection to the coupling part and to the rotation lock.

For example, the connection or support of the coupling part to or at the second connection component, said connection or support described as a non-rotating arrangement, can be provided by way of a tongue and groove connection, in other words a connection that only defines a single position of the two components relative to one another. A non-rotating arrangement can in this regard also include an arrangement in which the coupling part (one-piece) is designed as an integral part of the connection component. In particular, the coupling part can be integrated into a second connection component designed as a sleeve.

Here, a rotatable connection is preferred to be understood as an arrangement by which a rotation of two components relative to one another by a prescribable angle can be ensured. The rotatable connection can be a connection between a sleeve and a spindle, for example, wherein the rotatable connection doesn't necessarily include the sleeve and the spindle, but can only include the bearings or bearing surfaces provided for the same, for example. The rotatable connection is preferred to comprise at least one rotating hinge or constitutes a part of the rotating hinge. Here, a rotating hinge is preferred to be understood as a hinge that enables at least one rotation about one or more axes of rotation, wherein a translational degree of freedom can also be implemented. The rotating hinge is preferred to be disposed at the interface between two individual supports, but can also subdivide a single support into multiple sections. For example, the rotating hinge can be provided at the interface between a spindle and a sleeve. The rotatable connection is further preferred to not comprise any grooves.

A mount device here is preferred to be understood as device for holding, fixedly arranging and/or shifting at least one medical device, the mount device able to be permanently mounted to a wall (in a wall support) or a ceiling or on the floor of an operating room or any other room for medical purposes, for example a ceiling mount. The mount device is thus not completely displaceable freely in the operating room, but can only be moved within a specific radius of action, in particular relative to a fastening point or mounting point on a ceiling or wall of the operating room. The mount device can be designed as a ceiling supply unit mounted to a ceiling and can comprise one or more supply panels supported and positionable at one or more support arms. The mount device can also be designed as a monitor support. The mount device can also be designed as a so-called spring arm, in particular a spring arm mounted on a wall, and can comprise a lamp, for example. The mount device can also be designed as a so-called central axis, in particular a central axis mounted to a ceiling and comprising a plurality of support systems, each with at least one support, to which a monitor or lamp, for example, is mounted. However, the mount device does not necessarily have to be rigidly mounted to a wall, but can also be mounted on a mobile substructure. The mobile substructure can be positioned fixedly in the room, for example using brakes. An adjustable stopping mechanism is useful in this case as well.

An adjustable stopping mechanism here is preferred to be understood as any device that can limit a rotational angle and/or rotation range of a support within a specific adjustable range, in particular relative to another support or relative to an axis of rotation (fictitious) that is permanently positioned in the room, for example an axis of rotation that passes through a fixed fastening point on a wall of a room. It is preferred for the adjustable stopping mechanism to also comprise at least one form-locking connection or to be designed for form-locking. The adjustable stopping mechanism can also act in a force-locking manner.

A rotation range is preferred to be understood here as an angular range within which a support can be rotated relative to another support or to a wall. For example, the angular range can be 300° or 330°. The angular range can be established relative to different peripheral positions, for example from 0° to 300° relative to a north direction or from 30° to 330° relative to the north direction. The rotation range can be defined by the different rotational angle positions. However, the angular range doesn't have to always be large, but can also be limited to 180°, for example.

A rotation lock is preferred to be understood here as a part that is coupled to the rotational motion of the first connection component (for example a spindle), whose rotation can be blocked somehow and that cooperates with the first connection component, preferably in a form-locking manner. In the process, the rotation lock is preferred to protrude out from the first connection component, preferably in the radial direction. The rotation lock can be designed as a bolt or pin or integral protrusion, for example.

The coupling part is preferred to be understood here as a part that is coupled to the rotational motion of the second connection component (for example a sleeve) non-rotatingly and that cooperates with the second connection component, for example in a form-locking manner and in particular in rotational synchrony. In other words, the coupling part is provided at the second connection component in such a way that the coupling part and the second connection component always execute the same rotational motion. The position of the coupling part relative to the second connection component is then pre-defined, nor can the position be changed. The coupling part can be formed by the second connection component, for example cast thereon. It is preferable for the coupling part to be provided at the second connection component and to be axially fixed as well, in other words to not be able to move in the axial direction relative to the second connection component. The coupling part is preferred to only be connected to the second connection component or to be formed thereby and is decoupled from the first connection component, and only cooperates indirectly with the first connection component by way of the stopping device. For example, the coupling part can be designed to be circular and can have at least a form-locking contour in the form of a cogging, for example a sawtooth contour, in particular at the interface to the stopping device. The coupling part can then be called a gear ring. It is preferred for there to be no stops or rotation range-defining integral stops disposed on the coupling part. Such stops are not required, particularly since no relative rotational motion needs to or should take place between the coupling part and the stopping device. It is preferred for the coupling part to be adapted to support the stopping device rotationally fixed in an adjustable rotational position at the second connection component so that the rotation lock can abut against the stopping device in order to transfer a resultant corresponding reaction force from the stopping device to the coupling part.

A stopping device is preferred to be understood here as a part that is adapted to provide an integral stop in a position that is locally fixed relative to one of the connection components, in particular relative to the second connection component, wherein a (rotational) force, for example a torque, exerted on the stopping device in the peripheral direction can be transferred between the connection components by way of the integral stop. It is preferred for the stopping device to reach in sections around the axis of rotation in as small an arc as possible. The stopping device can then be described as an adjustment element, for example. It is preferred for the stopping device to be designed as an adjustment element with a contour that is designed at the end thereof to be form-locking in the axial direction in the direction of the coupling part. An adjustment element is preferred to be understood here as a part that can be positioned in different rotational angle positions, for example shifted by 15° at a time, which is to say in 24 different rotational angle positions, and that extends by only as small an amount as possible in the peripheral direction in the process. An integral stop is preferred to be understood here as any surface section or indent that is integrated into a base member of the stopping device.

An rotational angle position is preferred to be understood here as a relative rotational position of a support relative to another adjacent support or relative to an axis that points in a fixed direction in the room. The rotational angle position is preferred to be described relative to the rotational angle about the axis of rotation. The rotational angle position can also be described relative to an absolute (horizontal) angle, for example about a (fictitious) vertically aligned axis of rotation.

A form-locking contour is preferred to be understood here as a cogging or toothed contour or a contour with regular indents or protrusions. In the process, the shape of an individual tooth is largely arbitrary. It is preferred for the individual tooth to have the shape of a block or as seen in cross section the shape of a square. The form-locking contour is not necessarily exclusively form-locking, but can also be force-locking. The form-locking contour is preferred to not be firmly bonded so as to make sure that the at least one integral stop can be frequently positioned reversibly and arbitrarily in different rotational angle positions.

It is preferred for the stopping device to be adapted to transfer a rotational force exerted on the integral stop and acting in the peripheral direction directly between the first connection component and the coupling part. In other words: the stopping device is adapted to directly couple these two parts to one another.

It is preferred for the stopping device to be displaceable in the axial direction along the axis of rotation. This allows the rotatable connection to be easily adjusted. For example, it is only necessary to grasp the stopping device and pull it out axially, in particular upward opposite to the force of gravity.

It is preferable for the stopping device and/or the coupling part to reach around the axis of rotation, at least in sections, wherein the coupling part is preferred to be designed circular and is disposed peripherally around the axis of rotation. The stopping device, on the other hand, is preferred to be designed as a segment of a circular ring that covers only a small angular range.

It is preferable for the form-locking contour of the coupling part and the form-locking contour of the stopping device to each be designed as a gear ring, wherein the teeth of the gear ring preferably protrude in an axial direction at least approximately parallel to the axis of rotation. A gear ring is preferred to be understood here as contour that is designed as rotationally symmetric relative to the axis of rotation and that comprises a plurality of individual teeth, wherein the teeth are disposed at a uniform distance from one another. The gear ring design, for example, provides the advantage of smaller adjustment steps since the more teeth there are, the finer the starting point or beginning point of the rotational angle range can be defined, such as in 10° steps.

According to one exemplary embodiment, the stopping device is designed as a pluggable adjustment element, in particular a fixing block, preferably as an adjustment element that axially displaceable along the axis of rotation in the axial direction. This can ensure ease of operability and accessibility, in particular around the entire periphery, even when the coupling part is integrated into the second connection component.

It is preferred for the form-locking contour of the coupling part to be accessible in an axial direction at least approximately parallel to the axis of rotation such that the stopping device with the corresponding form-locking contour can be placed onto the coupling part in the axial direction. This makes installation and adjustment easier.

It is preferred for the stopping device to be positioned axially at the coupling part or at the second connection component in the axial direction solely based on the force of gravity. This free arrangement (without additional fasteners) can provide a stopping mechanism that can be adjusted or adapted especially easily. It is preferred to dispose the stopping device in such a way that a non-rotating arrangement of the stopping device at the coupling part (in particular exclusively) is ensured by way of a weight force or gravitational force acting on the stopping device. In the process, the only thing necessary for adjusting the stopping mechanism is to move the stopping device opposite to a weight force acting on the stopping device. There is no need to remove any radially inserted securing pins or screws. Rather, axial securing of the stopping device can be done if desired, for example by way of a snap ring. However, such a securing method is not necessarily required, so that the rotational range or rotational angle can be adjusted without any tools.

According to one exemplary embodiment, the stopping device is substantially or exclusively formed by a single base member, wherein the integral stop is preferred to be formed at a side surface of the base member and/or in a recess of the base member. In the process, an integral stop is understood to be an integral stop formed at the base member if the stop is provided by a (side) surface or shoulder (radial surface) or an inner indent of the base member, said surface or shoulder or indent not protruding out from the base member. This can ensure a compact and stable arrangement. An impulse exerted on the stopping device can be easily damped and absorbed. No torque is exerted due to any kind of protruding indents or protrusions. This can prevent the stopping device from being lifted out of the seat or from the position at the coupling part, even when the stopping device is relatively small or narrow.

According to one exemplary embodiment, the integral stop is formed by a bridge that has side surface sections that are displaced inward in the peripheral direction and or by side surfaces of the base member. This can ensure that the stopping device remains securely in a given insertion position at the coupling part even when relatively large impulses act on the stopping device.

According to one exemplary embodiment, the base member has an arc-shaped geometry, in particular an arc-shaped internal surface and/or an arc-shaped external surface. This allows the base member to be inserted directly between the coupling part and the first connection component. Regardless of the form-locking contour, the stopping device can thus have a geometry that corresponds to the geometry of the first connection component (in particular a tubular geometry) and the geometry of the coupling part. This allows the stopping device to be safely positioned between the first connection component and the coupling part, even when the stopping device is only manually placed between these two parts quickly or carelessly. This arrangement can ensure safe self-positioning, centering and alignment between the first connection component and the coupling part.

It is preferable for the base member to have an internal surface that is designed to geometrically correspond to a shell surface of the first connection component. The base member further preferably comprises at least one external, preferably arc-shaped surface section that is designed to geometrically correspond to at least one surface section of the form-locking contour of the coupling part. By designing the surfaces that ensure the relative arrangement of the stopping device relative to the first connecting component or to the coupling part near the form-locking contour, the stopping device can be positioned between the first connection component and the coupling part and can be made to abut these two parts in such a way that wedging or tilting can be substantially prevented even when a significant impulse acts on the stopping device when two stops hit one another (during heavy rotational movements) and has to be transferred to the second connection component. At the same time, it can be ensured that the two form-locking contours contact one another even in a stopping device that is inserted without using tools.

It is preferred for the base member to have an arc-shaped inner surface that forms a centering means for defining a radial position relative to the first connection component. A radial position defined by the inner surface can ensure engagement of the form-locking contour with good certainty. In the process, the invention is also based on the realization that the stopping device can be securely positioned between the first connection component and the second connection component, in particular since both connection components can be displaced relative to one another substantially free of play. This arrangement free of play can be used to easily (in particular without tools) securely position adjustable stopping devices. It is preferred for the inner surface to be designed to extend over the entire height (extension in a direction corresponding to the direction of the axis of rotation). This can ensure a stable arrangement at the coupling part and at the first connection component. This can effectively prevent tilting. When inserted, the stopping device can slide along the first connection component in the axial direction. In other words: the first connection component can be used to cause the two form-locking contours to seamlessly engage with one another even if visual contact is not possible for whatever reason. This kind of arc-shaped inner surface also facilitates shifting in the peripheral direction along the first connection component, in particular in order to detect or find a specific position for the stopping device at the coupling part.

According to one exemplary embodiment, the base member is designed as a circular ring segment preferably designed to be symmetric relative to a radial plane (RE) running centrally through the base member. This allows a plurality of different positions to be provided on the coupling part for the stopping device, and the integral stop can be provided on surfaces that can cooperate with the rotation lock or with an additional stopping ring at advantageous points with regard to the forces and torques to be transferred. It is preferable for the base member to be limited here by an inner surface and an outer surface that are concentric with one another and that can be arranged concentrically relative to the axis of rotation.

According to one exemplary embodiment, the stopping device, in particular the base member, has an extension about the axis of rotation in the peripheral direction of the coupling part corresponding to an arc in the range of 5° to 50°, preferably 10° to 40°, more preferably 15° to 30°. An arc extension of at least 10° is advantageous especially for stability reasons in particular and with regard to providing good safeguarding against tilting.

An arc extension of no more than 30° or 40° is advantageous especially with regard to a large rotational angle range, in particular in connection with two stopping devices, both of which are disposed at the coupling part and the two of which define different rotational angle positions. Also, if the arc extension is kept as small as possible, the two stopping devices can be disposed next to one another without significantly limiting the rotational angle range.

According to one exemplary embodiment, the form-locking contour of the coupling part is designed on a shell surface that faces inward and/or on a top surface of the coupling part pointing in the axial direction, wherein the form-locking contour of the stopping device is designed on a bottom side that point in the axial direction toward the coupling part. This can ensure an easily accessible, easy to operate insertion connection in which the individual insertion positions are visible and can be counted off, for example in order to change the rotating angle by 45° which corresponds to three more insertion positions in the peripheral direction, for example.

It is preferred for the form-locking contour of the stopping device to be designed on the bottom side of the base member, in particular radially on the outside between the bottom side and the outer surface. This position of the form-locking contour at the base member favors safer positioning of the stopping device between the two connection components, for example.

According to one exemplary embodiment, the form-locking contour of the stopping device is formed by at least one notch that connects an outer surface with a bottom side of the stopping device (in particular of the base member) and that thereby interrupts an edge or radial ledge formed on the outside between the outer surface and the bottom side, wherein the notch is disposed at a distance from the opposing side surfaces of the stopping device.

Keeping the notch at a distance can ensure that the stopping device can support itself in the peripheral direction when an impulse in the peripheral direction acts on the stopping device.

According to one exemplary embodiment, the form-locking contour of the stopping device is formed by way of teeth, in particular one or two teeth, wherein the teeth are preferred to be disposed at two opposing side surfaces or to define the side surfaces at least in sections. The stopping device can support itself well in the peripheral direction using the teeth. It is preferred for the teeth to each comprise four open area sections for defining the outer contour of the teeth. The teeth then do not comprise five surfaces as would be the case with a protruding tooth or cube. In other words, the teeth are preferred to not be protruding teeth, but rather teeth that are integrated into the base member and formed by the at least one notch. According to a variation, protruding teeth with five surfaces can also be provided.

The form-locking contour of the stopping device is preferred to comprise opposing radial surfaces (shoulders) that are designed geometrically to correspond to opposing radial surfaces of the form-locking contour of the coupling part. This can ensure an effective transfer of forces and impulses in the peripheral direction and at the same time allow the stopping device to be easily re-insertable or repositionable.

According to one exemplary embodiment, the stopping device has a height (H) equal to an extension in a direction that corresponds to the direction of the axis of rotation, the height being greater than a height (H1) of the form-locking contour by a factor of 1.5 to a factor of 10, preferably by a factor of 2 to 7, more preferably by a factor of 3 to 5. Such size relationships can increase the stability of the arrangement and can facilitate (manual) handling of the stopping device in particular grasping, repositioning and insertion. The stopping device, in particular a base member, protrudes considerably from the form-locking contour of the coupling part, but a stable arrangement at the coupling part can be ensured nevertheless.

According to one exemplary embodiment, the form-locking contour of the coupling part is formed at a coupling part edge that protrudes in the axial direction. A radial position of the stopping device can be defined using the edge. The form-locking contour of the coupling part is preferred to comprise surface sections against which the stopping device can abut with corresponding surface sections, whether against inner radial surface sections and/or outer radial surface sections. In other words, the form-locking contour of the coupling part is adapted to support the stopping device in a pre-defined radial position relative to the first connection component, in particular by way of an inner radial surface section and/or an outer radial surface section. A pre-defined radial position can ensure that the stopping device can be securely positioned between the first connection component and the coupling part and that the form-locking contours engage with one another even when the contours are simply inserted (without using tools). A pre-defined radial position also allows the form-locking contours to be designed with some play so that the contours operate more smoothly if desired. Thanks to the pre-defined radial position and a position or placement that is limited between the first connection component and the coupling part, a smooth form-locking contour is provided which makes installation and repositioning easier without the use of a tool, for example.

Damping can also be provided in a simple manner here. In particular, an elastomer can be provided at one or more side surfaces of the stopping device, in particular of the base member, whether integrated or in the form of an adhered element, for example a substantially flat pad.

According to one exemplary embodiment, the stopping device has a sectional T-shaped profile in a horizontal plane (HE) orthogonal to the axis of rotation (R), at least in sections relative to the direction of the axis of rotation, in particular at a lower section, preferably at a bottom side. This geometry for one thing can provide an integral bridge, and for another the stopping device can be optimized with regard to an especially stable arrangement at the coupling part. The T-profile can ensure that impulses acting in the peripheral direction from both sides can be redirected centrally to the stopping device.

According to one exemplary embodiment, the stopping device comprises two recesses that define a bridge therebetween, wherein the bridge is preferred to be disposed centrally relative to the peripheral direction and internal radially. This arrangement can ensure an even force introduction to the stopping device from both sides, wherein the bridge can be integrated with a/the base member of the stopping device in a simple manner.

According to one exemplary embodiment, the rotatable connection comprises a stopping ring that can be mounted rotationally blockable at the first connection component and that has at least one stop that corresponds to the integral stop, wherein the at least one stop is preferred to axially overlap the integral stop. An additional stopping ring can expand the adjustable rotation range, for example by 90°. A stopping ring in combination with a plurality of stopping devices can enable a particularly large variance when adjusting the action radius.

The connection or placement of the stopping ring to or at the connection component, which is described as a rotationally blockable arrangement, can be produced by way of two protrusions that hit against one another or can engage with one another, for example, in other words by way of a form-locking connection. The stopping ring is rotatably disposed about the axis of rotation, in particular together with the first connection component. The stopping ring can be rotated together with the first connection component when engaged, which can be secured by way of a stop in the form of a bolt or securing pin. A rotationally blockable arrangement can thus involve an arrangement in which it is indeed possible for there to be a relative rotational motion between the respective part and the respective connection component, but that the degree of the rotational motion is limited by some kind of stop ab a specific rotational angle. As soon as the connection component meets a stop of the stopping ring, a relative rotational motion between the connection component and the stopping ring is no longer possible in the corresponding direction of rotation. In other words: in a rotationally blocked arrangement, the stopping ring can no longer be further rotated about the first connection component, at least in one rotational direction. A relatively large rotational angle range can be adjusted using a rotationally blockable arrangement, in particular a range with a rotation angle of greater than 360°. According to a variant, a rotationally blockable arrangement of this nature can also comprise a non-rotating arrangement, in other words a tongue and groove connection, for example.

It is preferred for the stopping ring to be mounted rotationally blockable at the first connection component, but only preferably with regard to a rotational motion. In other words: the rotationally blockable arrangement doesn't necessarily involve a pre-defined axial position. To the contrary, the stopping ring is preferred to be mounted at the second connection component in the axial direction by way of the stopping device and/or the coupling part. In the process, the first connection component can preferably be positioned at the second connection component axially, or vice versa, for example by way of a shaft snap ring.

A stopping ring is preferred to be understood here as a part that is coupled to the rotational motion of the first connection component (for example a spindle), whose rotation can be blocked somehow and that cooperates with the first connection component, preferably in a form-locking manner. The stopping ring is preferred to be displaceable in the axial direction relative to the first connection component. In the peripheral direction, relative displacement to one another is blocked or can be blocked beginning at a certain rotational angle. The stopping ring can be circular, for example, and in that case can be called a stopping ring defining at least one stop. A stop is preferred to be understood here as any protrusion or indent, and one that protrudes in the axial direction in particular.

Preferably, the stopping device is adapted to prevent direct interaction between the stopping ring and the coupling part. The stopping device is preferred to be intermediately mounted between the stopping ring and the coupling part and to be adapted to transfer a torque between the stopping ring and the coupling part.

Preferably, the stopping device is disposed axially between the stopping ring and the coupling part. As an arrangement, "axially between" is preferred to be understood as one in which the first [connection component] and the coupling part are not directly coupled together, but are only indirectly coupled by way of the stopping device. An "axially between" arrangement is preferred to mean that the stopping ring does not have to engage the coupling part in the axial direction, but that an engaging or cooperation of the stopping ring with the coupling part (alone) can be secured by way of the stopping device. In other words: the stopping ring is preferred to only connect directly with the coupling part, in particular by way of the stopping device.

It is preferred for the stopping ring to be displaceable in the axial direction along the axis of rotation. This allows the stopping device, together with the stopping ring, to be displaced in the axial direction in a simple manner in order to adjust the rotation range or rotational angle. There is no need to remove any kind of bolt that reaches in in the radial direction or to remove any sleeve that holds the bolt in order to displace the stopping ring and the coupling part relative to one another in the axial direction. The stopping ring can be placed over a centering device at an inner shell surface at the second connection com-onent.

It is preferred for the stopping ring and the coupling part and the stopping device to be disposed in series consecutively in the axial direction. This allows the rotatable connection, in particular the beginning point or starting point of the rotational angle range to be adjusted easily, in particular after the stopping ring and the stopping device are pushed apart in the axial direction.

The rotation range can be easily adjusted by axially displacing the parts and the stopping device relative to one another. The arrangement consecutively in series also facilitates easy installation. An arrangement consecutively in series is understood here to be an arrangement in which the stopping ring sits against the stopping device and in which the stopping device sits against the coupling part.

It is preferred to dispose the stopping device in the axial direction between the stopping ring and the coupling part and for the stopping device to overlap the coupling part in the axial direction in the area of a form-locking contour and to overlap the stopping ring in the area of the stop in the axial direction. By disposing the stopping ring and the stopping device in the axial direction in overlapping fashion, the stopping mechanism can be provided in the form of an insertion system with a simple design. It is also possible to ensure good stability in the arrangement, in particular since the stopping ring and the stopping device can stabilize against tipping, especially through the use of the inner and/or outer shell surface of the stopping device. It is preferred for the stopping ring to be dimensioned and geometrically designed such that the stopping ring, in particular the at least one stop, can be disposed at least partially outside around the stopping device and/or at least partially inside the stopping device. This arrangement allows the at least one integral stop to be disposed at an outer or inner shell surface of the stopping device, whereby a force in the peripheral direction can be transferred. The integral stop can be designed to be especially robust and massive.

According to a variant, the stopping ring is circular and comprises two or more stops that are disposed opposite one another and that protrude in the axial direction from a disk of the stopping ring, in particular at an outer shell surface or circular surface. The stopping ring can have an area that is rotationally symmetric, in particular a disk-like area. A disk is preferred to be understood here as a substantially flat part that extends substantially in a plane which points in the radial direction and that has much less extension in an axial direction orthogonal to the plane. A design as a disk has the advantage that a sliding surface can be provided in a simple manner on a respective face of the disk.

According to one exemplary embodiment, the stopping ring and the stopping device and alternatively also the coupling part can be axially disposed or positioned or mounted in the axial direction at the second connection component. It is preferable for at least the stopping ring and the stopping device to be positioned in the axial direction solely due to the force of weight axially at the second connection component. This free arrangement (without additional fasteners) can provide a stopping mechanism that can be adjusted or adapted especially easily.

According to one exemplary embodiment, the stopping ring is disposed such that a rotationally blockable arrangement at the coupling part (in particular exclusively) is ensured by way of a weight force or gravitational force acting on the stopping ring. In the process, the only thing necessary for adjusting the stopping mechanism is to displace the stopping ring opposite to a weight force acting on the stopping ring, in particular without the use of a tool. There is no need to remove any radially inserted securing pins or screws.

It is preferred for the at least one integral stop to comprise opposing side surfaces that correspond to the at least one stop of the stopping ring and that can be disposed preferably on the same diameter arc as the at least one stop.

According to one exemplary embodiment, the rotatable connection comprises at least two stopping devices, wherein the stopping ring can be axially positioned in the axial direction at the coupling part or at the second connection component using the stopping device. This arrangement facilitates adjustment of the rotatable connection even when an additional stopping ring is provided. It is preferred that the stopping ring be disposed or can be disposed such that the axial arrangement relative to the coupling part is secured by a weight force acting on the stopping ring. This arrangement facilitates adjustment without the use of tools and can enable self-securing positioning.

According to one exemplary embodiment, the stopping ring and the stopping device form a bearing support for one another, in particular a sliding bearing for sliding motions relative to one another. It is preferred for at least two stopping devices and the stopping ring to form a sliding bearing together. The stopping ring lies atop the respective stopping device here. This allows the stopping ring to be displaced frictionlessly relative to the stopping device and to the coupling part even when there is a normal force acting on the contact surface between the stopping ring and the stopping device. Of course, the normal force doesn't have to be large, since it can be equal to the weight of the stopping ring, for example. The bearing can provide a smooth rotatable connection, and the interaction between the individual components of the rotatable connection can certainly be optimized. It is preferable for the stopping device to be disposed between the stopping ring and the coupling part in such a way that the stopping ring is only in contact with the stopping device, but not with the coupling part. The coupling part is likewise only in contact with the stopping device. In other words, the stopping ring cooperates with the coupling part (preferably with the coupling part only) by way of the stopping device.

According to one exemplary embodiment, the stopping ring comprises a sliding surface at an end side, in particular at an end side that faces the stopping device, and is adapted to slidingly rotate on the stopping device, in particular on at least two stopping devices, using the sliding surfaces. The stopping device can further comprise a sliding surface at a top side, in particular at a top side facing the stopping ring and facing away from the second connection component, and can be adapted to support the stopping ring using the sliding surface in order to allow a sliding rotational motion about the axis of rotation. The sliding surface of the stopping ring can, preferably, be designed to be completely surrounding as a circular surface, for example, or only in sections. The surface contact on the stopping device can provide a robust stopping mechanism that can be actuated manually in a simple manner. No screws or other securing means or fastening elements need to be removed, and in any case an optional snap ring can be provided to secure the stopping ring axially. The interlocking of the components, in other words the stopping ring, the stopping device and the coupling part, can be secured solely by the force of gravity. The surface contact on a circular face can secure a precise positioning of the components relative to one another and the rotatable connection can be designed very robust and smooth.

A sliding surface is preferred to be understood here as a surface that has a low coefficient of friction for sliding friction, whether due to a particularly low surface roughness or a very smooth surface or because it is a low-friction material with lubricating characteristics. For example, die-cast zinc, with or without a coating, can be used as the material for the stopping ring or the stopping device.

The object mentioned above is also achieved using a support system for a mount device for arrangement in an operating room and for positioning a medical device in the operating room, the support system comprising a rotatable connection according to the invention and the first connection component, in particular in the form of a spindle, and the second connection component, in particular in the form of a sleeve.

A support system is preferred to be understood here as components of the mount device that assume the function, at least partially, of holding and positioning the medical device. The support system can comprise a plurality of preferably rigid arms or supports that are displaceable relative to one another, as well as a plurality of levers, hinges or bearings.

A medical device is preferred to be understood here as a lamp, a monitor and/or a supply panel for providing means for supplying a patient and/or instruments for a surgeon and/or light, purified air or other media needed in the operating room. The medical device is preferred to comprise some kind of control panel and/or some kind of display device for graphically showing patient data, for example.

According to one exemplary embodiment, the second connection component is designed as a sleeve, in particular a forked sleeve, wherein at least the stopping device and the coupling part and preferably also the stopping ring are disposed in the sleeve, in particular between two annular sections of the sleeve, preferably in one of the two annular sections, wherein the rotatable connection is preferred to comprise an intermediate element that is placed in the sleeve, in particular in one of the two annular sections.

This can allow a rotatable connection to be provided, the stopping device of which is easy to access, which facilitates adjustment of the rotational angle or rotational angle range. The individual components can be placed easily into the sleeve, in particular from the side in the radial direction. An additional intermediate element can also be placed in the sleeve here, in particular into one of the two annular sections, in particular to compensate for a draft angle and/or to facilitate a simple or cost-effective manufacture of the form-locking contours. The individual components can also be easily displaced in the axial direction relative to one another in order to adjust the rotational angle or rotation range.

The intermediate element can also ensure a very flat design of the rotational connection in the axial direction, which is advantageous for central axes, which usually already have a considerable extension in the axial direction, for example.

The object mentioned above is also achieved by a mount device for arrangement in an operating room and for positioning a medical device in the operating room, the mount device comprising a rotatable connection according to the invention or the support system described above with the rotatable connection according to the invention.

In a special embodiment, the mount device comprises a support system for arrangement in an operating room and for positioning a medical device in the operating room, the support system comprising at least one support, in particular a support arm, with a sleeve that is mounted rotatably (relative to a locally fixed part of the mount device or relative to another support of the mount device) about an axis of rotation at a spindle on a rotatable connection, in particular a rotatable connection according to the invention, wherein the rotatable connection comprises an adjustable stopping mechanism disposed between the spindle and the sleeve and which is adapted to establish at least two different relative rotational angles of the sleeve relative to the spindle or at least two different angle ranges, wherein the adjustable stopping mechanism comprises: a rotation lock that can be disposed non-rotatingly at the first connection component; a coupling part that can be disposed non-rotatingly at the second connection component and that comprises a form-locking contour for establishing individual rotational angle positions; wherein the adjustable stopping mechanism comprises at least one stopping device with an integral stop, wherein the stopping device comprises a form-locking contour that corresponds to the form-locking contour of the coupling part, the form-locking contour making it possible to position the stopping device non-rotatingly at the coupling part in at least two different rotational angle positions in such a way that the integral stop is adapted to cooperate with the rotation lock and to establish the different rotational angles or rotation ranges, and wherein the stopping device is formed by a base member, wherein in two recesses of the base member the integral stop is also formed at least by a bridge located between the two recesses, the bridge comprising side surface sections that are displaced inward in the peripheral direction, wherein the bridge is disposed at least approximately centrally relative to the peripheral direction.

This allows the mount device, in particular individual supports relative to one another, to be positioned flexibly and very easily, wherein the stopping device can be securely positioned without having to use a tool. The integral stop can be displaced in the coupling part in order to establish a suitable rotational angle position, in particular relative to a specific arrangement of the mount device relative to other components in the operating room.

A support is preferred to be understood here as a cantilever or support arm that extends in a specified direction and that can ensure the desired action radius for the different intended positions of the medical device, in particular by way of a rotating motion about a rotatable connection. Thee support can also be selectively pivoted vertically and/or displaced translationally vertically. The support can also be a telescopic device with an (additional) degree of freedom of movement in the translational direction along the longitudinal axis of the support. The support can be formed, at least in part, by an injection-molded profile, in particular an aluminum injection-molded profile, for example.

The stopping device can define a rotational range or a rotational angle magnitude of the rotatable connection, in particular an allowable relative rotational angle of the two connection components relative to one another, both of which are easily adjusted.

It is preferable for the coupling part to be disposed at the support, or one of the supports, in the area of the rotatable connection. A contour or stop can be locally fixed at one of the supports, the contour being capable of positioning the support in the various rotational angle positions relative to the other supports or relative to some other locally fixed part.

Figure 2:
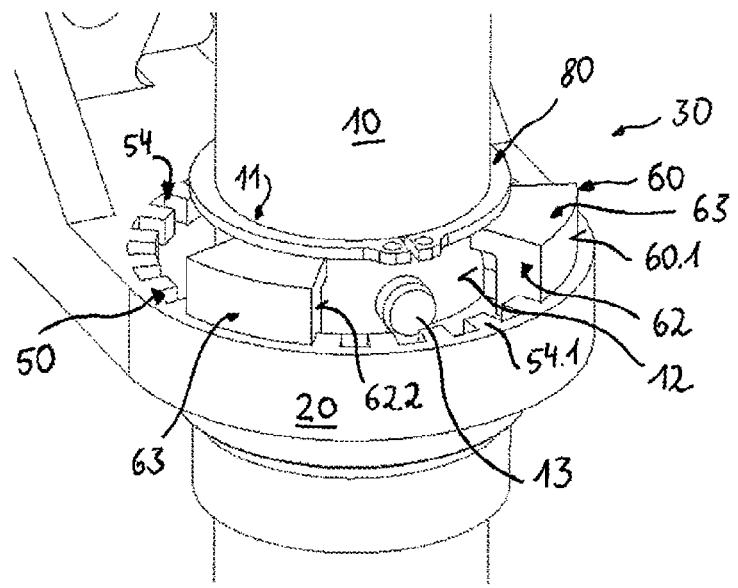
Figure 3:
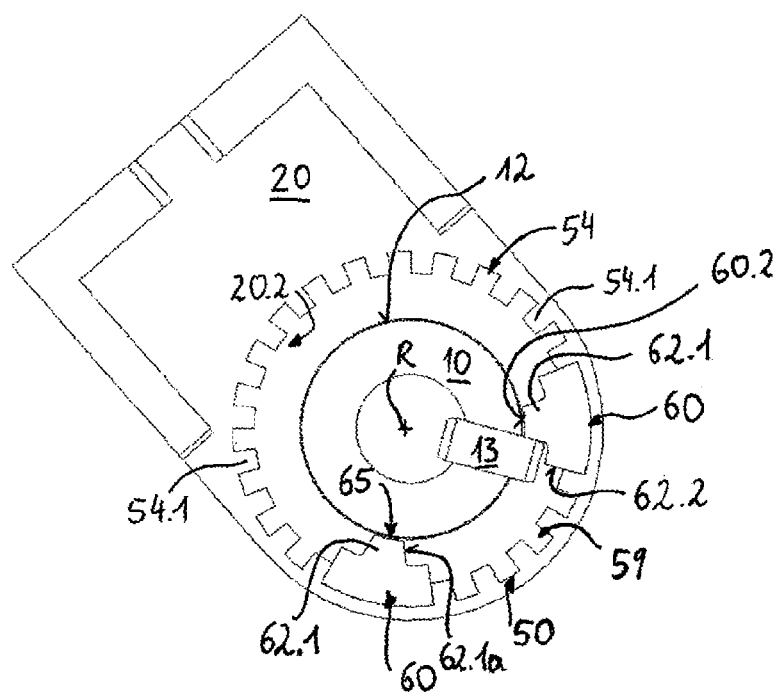
Figure 6:
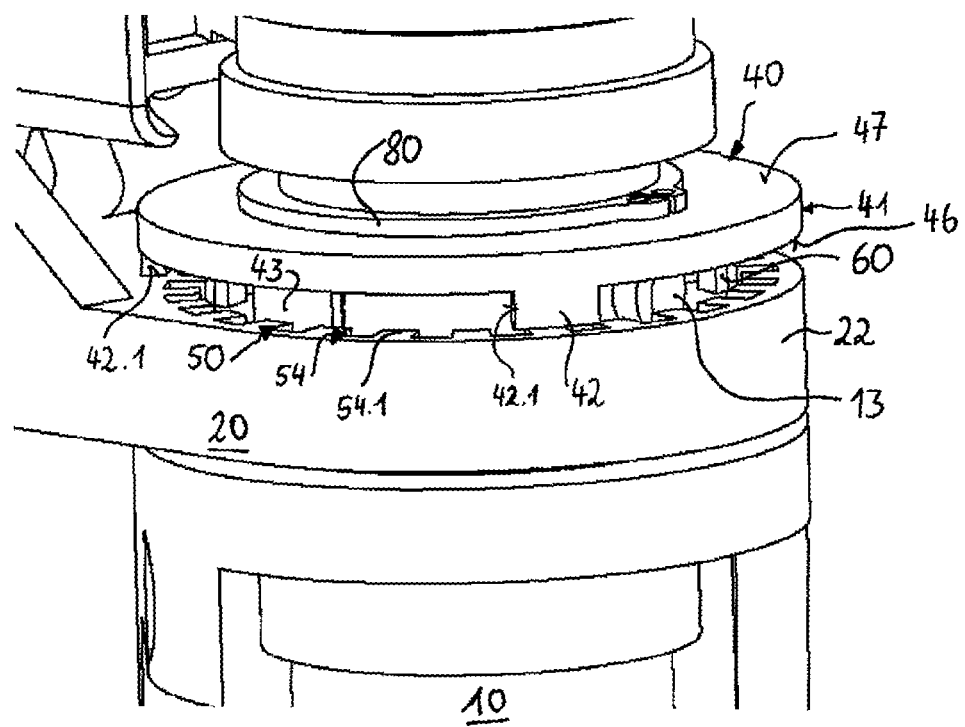

The invention is explained in more detail in the following drawing figures using exemplary exemplary embodiments. Shown are:

FIG. 1 A rotatable connection according to one exemplary embodiment of the invention shown schematically in a perspective view;

FIG. 2 The rotatable connection according to the exemplary embodiment shown in FIG. 1 in a perspective side view;

FIG. 3 The rotatable connection according to the exemplary embodiment shown in FIG. 1 in a top view;

FIGS. 4A and 4B A fixing element for the exemplary embodiment shown in FIGS. 1 to 3 of the rotatable connection, each shown in a perspective side view;

FIG. 5 The rotatable connection according to the exemplary embodiment shown in FIG. 1 in a perspective side view in exploded representation in a situation in which a rotational angle and/or rotation range is being adjusted; and FIG. 6 A rotatable connection according to another exemplary embodiment of the invention shown schematically in a perspective view.

In the description of the following figures below, individual reference numbers not explicitly explained in connection with a specific figure can be found in the other figures.

Shown in FIG. 1 is a rotatable connection 1 that is disposed at a mount device 100 about an axis of rotation R. The mount device 100 comprises a support system 101 with a first support 102 and at least one other support. The rotatable connection 1 comprises a first connection component 10, in particular in the form of a spindle, and a second connection component 20, in particular in the form of a sleeve. The first support 102 is mounted about the first connection component 10 and connected to the second connection component 20, and the other support is mounted about the first connection component 10 and connected to another sleeve. The sleeve 20 can be described as fork-like and comprises two penetrations 21, each of which is located in an annular section 22 of the sleeve 20, through which the first connection component 10 is passed. A cavity is formed between the annular sections 22, the cavity being manually accessible in the radial direction, in particular to adjust a stopping mechanism 30. The axial position of the sleeve 20 on the spindle 10 can be defined using a shaft snap ring fastened to the spindle or by a shaft nut.

The rotatable connection 1 comprises an adjustable stopping mechanism 30 that is disposed between the spindle 10 and the sleeve 20. The stopping mechanism 30 comprises two stopping devices 60 and a coupling part 50. Each stopping device 60 is designed as a relatively narrow fixing element. The coupling part 50 is designed as a gear ring (see FIG. 3). The gear ring 50 is placed inside the sleeve 20 or is formed by the annular section 22 of the sleeve 20, in particular at an edge or an inner shell surface of one of the two annular sections of the fork-shaped sleeve 20.

Shown in detail in FIG. 2 is the position of the stopping device 60 relative to the spindle 10 and to the sleeve 20. The spindle 10 comprises a groove 11 for holding a snap ring 80. The snap ring 80 can keep the stopping devices 60 from shifting upward in the axial direction unintentionally. Each stopping device 60 comprises a top side against which the snap ring 80 can sit. The snap ring 80 is not necessarily required. Rather, it can be optionally added afterward, in particular if the spindle 10 is not aligned vertically. The snap ring 80 can be easily removed in order to adjust the stopping mechanism 30. To do so, the respective stopping device 60 can be pulled out upward to the position shown until the stopping device 60 no longer engages with the sleeve 20 or gear ring 50. The stopping device 60 can then be moved back downward in engagement with (inserted into) the sleeve or the gear ring 50 in a different rotational angle position. The adjustable stopping mechanism can be adjusted without the use of any securing screws or rings whatsoever.

Each stopping device 60 is disposed between the spindle 10 and a form-locking contour 54 of the coupling part 50. The form-locking contour 54 is formed by individual teeth 54.1. Disposed in the spindle 10 is a rotation lock 13 in the form of a radial bolt that radially overlaps the respective stopping device 60. The radial bolt 13 reaches into a cavity formed between the spindle 10 and the form-locking contour 54. Each stopping device 60 borders a shell surface 12 of the spindle 10. The inside diameter of an inner surface of the fixing element 60 adjacent to the spindle is at least approximately equal to the outside diameter of the outer shell surface 12 of the spindle 10 or slightly larger. Each stopping device 60 has an outer surface 60.1 that is designed to geometrically correspond to the form-locking contour 54. Each stopping device 60 has two opposing side surfaces 62.2 or radial surfaces or shoulders that are preferred to extend, at least approximately, in a plane that runs parallel to the axis of rotation R. The flat side surfaces 62.2 form stopping surfaces against which stops sit when a relative rotation is performed. The flat side surfaces 62.2 correspond to stops of a stopping ring, for example, as described in connection with FIG. 6.

Each stopping device 60 comprises an integral stop 62 that is formed by a base member 63 of the stopping device 60. Each stopping device 60 is substantially formed solely by the base member 63, which is in the form of an arc segment, so that the stopping device 60 can be identified as a fixing element or a fixing block. In the exemplary embodiment shown, a bridge (see bridge 62.1 in FIG. 3) is an effective component of the integral stop 62. The bridge cooperates with the radial bolt 13. Each fixing block 60 can be positioned relative to the sleeve 20 in different rotational angle positions, wherein the rotational angle positions are defined by the arrangement and number of teeth 54.1.

Shown in FIG. 3 is the way in which the radial bolt 13 can cooperate with the fixing elements 60. Both fixing elements 60 are disposed in such a way that only a rotational angle of 90° can be achieved, wherein the rotation range facilitates alignment of the sleeve 20 between the position shown and a position in which the sleeve 20 is located all the way to the left of the spindle 10. In the position shown, the radial bolt 13 sits against the bridge 62.1, in particular against side surface sections 62.1a that are offset inward relative to the side surfaces 62.2. The bridge 62.1 is disposed centrally relative to the peripheral extension of the respective fixing block 60. The respective side surface 62.2 remains without function in this exemplary embodiment.

The form-locking contour 54 of the gear ring 50 is designed at an inward-facing shell surface 20.2 of the sleeve 20. Notches 59 into which the fixing blocks 60 are inserted are formed between the individual teeth 54.1. Each of the fixing blocks 60 are centered in the cavity formed between the spindle 10 and the shell surface 20.2 of the sleeve 20 by way of a centering means 65 that is located at the shell surface 12 of the spindle 10, wherein the centering means 65 can be provided by an inner surface 60.2. A section of the inner surface 60.2 can form the centering means 65.

Alternatively, a damping element (not shown) can also be disposed at the respective fixing element 60, the damping element being able to act between the radial bolt 13 and the form-locking contour 54 of the coupling part 50. For example, the damping element can be designed as an elastomer whose geometry corresponds to the geometry of the fixing element 60, in particular the bridge 62.1. The damping element can be designed as a separate part or as an integral part of the base member, for example. However, a damping function can also be achieved by way of a suitable material selection (a single material) for the fixing element 60; this obviates the need for different materials.

Shown in FIG. 4A is the fixing element 60 in detail with a view of an inner side. The fixing element 60 has an absolute height H. The inner surface 60.2 is designed over this entire absolute height H and provides the centering means 65. The inner surface 60.2/centering means 65 is designed to be geometrically corresponding to the shell surface of the spindle (see FIG. 3). In other words: The inner surface 60.2/centering means 65 is concave and describes a circular arc. Two lateral recesses 67 define the integral bridge 62.1, which is flanked by the offset side surface sections 62.1a. The integral stop 62 is formed by the offset side surface sections 62.1a and the side surfaces or shoulders 62.2, wherein the shoulders 62.2 fulfill a function that in particular is in connection with the exemplary embodiment described in FIG. 6. The fixing element 60 has a flat bottom side 68 for sitting against the sleeve 20 or form-locking contour 54 shown in FIG. 3. In a section along one of the two horizontal planes indicated by HE, the fixing element 60 has a T-shaped cross sectional profile.

Shown in FIG. 4B is the fixing element 60 in detail with a view of an outer side. The fixing element 60 comprises a form-locking contour 64 formed by individual teeth 64.1. Two notches 69 are disposed between the outer surface 60.1 and the bottom side 68, the notches defining the three teeth 64.1. Two of the three teeth 64.1 are located on the outside and are formed in part by the side surfaces 62.2 (see FIG. 4A). Each tooth 64.1 is defined by four different surface sections, namely an outer radial surface section 64.1a, two shoulders or radial surface sections 64.1b and one section on the bottom side 68. The notches 69 each define an inner surface section 69.1 that can correspond to a tooth of the form-locking contour of the coupling part (see FIG. 5). The fixing element 60 comprises an edge 64.2 or an outer radial bottom ledge that is interrupted by the notches 69. In other words: The notches 69 and teeth 64.1 are designed on the outer radial bottom ledge 64.2.

Shown in FIG. 5 is one of the fixing blocks 60 in an arrangement in which the stopping mechanism can be adjusted. The respective fixing block 60 can be repositioned and reinserted into the cavity axially by axially pulling the fixing block out of the cavity between the spindle 10 and the sleeve 20. This allows the form-locking contour 64 of the fixing element 60 to be manually released from the corresponding form-locking contour 54 of the gear ring 50 without the use of a tool and pulled out in the axial direction and re-inserted, also manually without using a tool. The fixing block 60 can be led along the shell surface of the spindle 10 in the process. There is no snap ring provided in the groove 11 at the spindle 10.

The coupling part 50 comprises an edge 51 at which the form-locking contour 54 is made. The edge 51 can define a radial position for the fixing element 60 and can in the process position the fixing element 60 in a secure way in the annular cavity between the spindle 10 and the sleeve 20 or coupling part 50. The form-locking contour 54 is designed as a cogging that protrudes in the axial and the radial direction. The form-locking contour 54 comprises a plurality of individual teeth 54.1 that are disposed at a uniform separation distance in the peripheral direction. Each tooth 54.1 is defined by four different surface sections, namely an inner radial surface section 54.1c, two shoulders or radial surface sections 54.1b and one corresponding surface section on a top side of the edge 51. Each tooth 54.1 extends up to an outer radial surface section 54.1a at which the fixing element 60 can be positioned in the radial direction.

The respective fixing block 60 is designed as an arc segment symmetric relative to a radial plane RE running centrally through the fixing block 60 or base member of the fixing block 60. The form-locking contour 64 of the fixing block 60 is designed over a height H1 that is smaller than the height H of the fixing block by a factor of about 3 to 5. The height H of the fixing block is greater than the height H1 of the form-locking contour 64 by a factor of about 3 to 5. The fixing block 60 comprises a circular arc section a in the peripheral direction corresponding to an arc within a range of 20° to 25°. Such a peripheral angle is a good compromise between adjustment variance and stability. The respective fixing block 60 comprises a surface 66 that can be designed as a sliding surface as described in connection with FIG. 6.

Shown in FIG. 6 is the way in which an additional, alternative stopping ring 40 can be mounted rotationally blockable on the spindle 10 and on a plurality of fixing elements 60, in particular in order to adjust the rotational range to greater than 360°. The stopping ring 40 comprises a form-locking element 43 that corresponds to the bolt 13, the element being disposed on an inside of the stopping ring 40. A dead angle that arises due to the required minimum extension of the fixing element 60 in the peripheral direction can be bridged by way of this rotationally blockable arrangement. The rotationally blockable arrangement makes possible a pre-definable rotation range with a rotational angle of greater than 330°, or even greater than 360°, in particular up to 420°. A rotationally blockable stopping ring 40 can also be identified as an intermediate ring that bridges a dead angle and which is disposed and acts between the spindle 10 and the fixing elements 60. The fixing element 60 and the stopping ring 40 are placed in series consecutively in the axial direction and mesh with one another in the axial direction.

There are three stops 42 provided at the stopping ring 40, the stops being disposed offset relative to one another at an angle of about 120° in the peripheral direction. Also, the form-locking element 43 is disposed at a peripheral position at least approximately centrally between two of the three stops 42. This arrangement of the stops 42 and the form-locking element 43 relative to one another can also provide a good load distribution. The stopping ring 40 also comprises a disk-shaped section 41. The three stops 42 protrude in the axial direction from the disk-shaped section 41.

Each fixing element 60 here can be placed in the cavity radially between the spindle 10 and the sleeve 20 and the rotation lock or bolt 13 reaches into this cavity in which the form-locking element 43 can also be shifted.

FIGS. 5 and 6 show that the stopping ring 40 can abut a corresponding top side 66 of the fixing element 60 with a (first) face 46 and can slide therealong during a relative rotational motion. The face 46 has a circular sliding surface section that is disposed between the stops 42 and the form-locking element 43. The top side of the fixing element 60 and the bottom side or sliding surface 46 of the stopping ring 40 form a sliding bearing. In addition, the top side of the fixing element 60 can also comprise a coating with a low coefficient of friction, for example, or the fixing element 60 can be designed, at least partially, from an appropriate material. The same applies to the stopping ring 40 or surface 46. However, the force acting on the top side of the fixing element 60 is not large: the stopping ring 40 has a relatively small mass. A frictional force between the stopping ring 40 and the fixing element 60 can be almost negligible in this arrangement. The face 46 and the top side of the fixing element 60 or corresponding surface section can also be identified as sliding surface sections.

In the arrangement shown in FIG. 6, the components can be alternatively axially secured using a snap ring 80 that cooperates with a top side or second face 47 of the stopping ring 40. However, use of the snap ring 80 is not necessarily required in this exemplary embodiment either. Rather, the individual components can also secure one another, in particular solely due to a weight force acting thereon that can secure the axial positioning.

Embodiments of the invention relate to a rotatable connection for a mount device for placement in an operating room, comprising an adjustable stopping mechanism that can be disposed between a first connection component and a second connection component that is mounted rotatably relative to the first connection component about an axis of rotation, the adjustable stopping mechanism being adapted to establish at least two different relative rotational angles of the connection components relative to one another or at least two different rotation ranges, wherein the adjustable stopping mechanism comprises: a rotation lock that can be disposed non-rotatingly at the first connection component; a coupling part that can be disposed non-rotatingly at the second connection component and that has a form-locking contour for establishing individual rotational angle positions; wherein the adjustable stopping mechanism comprises at least one stopping device with an integral stop, wherein the stopping device comprises a form-locking contour that corresponds with the form-locking contour of the coupling part, the stopping device being positionable non-rotatingly at the coupling part by means of said stopping device contour in at least two different rotational angle positions in such a way that the integral stop is adapted to cooperate with the rotation lock and to establish the different rotational angles or rotation ranges. The invention further relates to a support system or mount device comprising such a rotatable connection.

REFERENCE LIST

1 Rotatable connection
10 First connection component, in particular a spindle
11 Groove
13 Rotation lock, in particular a radial bolt
20 Second connection component, in particular a sleeve
20.2 Inward-facing shell surface of the sleeve
21 Penetration for the first connection component
22 Circular section of the fork-shaped sleeve
30 Adjustable stopping mechanism
40 Stopping ring
41 Disk-shaped section
42 Stop
42.1 Side surface, in particular flat stopping surface
43 Form-locking element
46 First face, in particular sliding surface
47 Second face
50 Coupling part, in particular gear ring
51 Edge
54 Form-locking contour 54.1 Individual tooth
54.1a Outer radial surface section
54.1b Shoulder or radial surface
54.1c Inner surface section
59 Notch
60 Stopping device, in particular fixing element or fixing block
60.1 Outer surface
60.2 Inner surface
62 Integral stop
62.1 Bridge or inner indent, in particular radial inwardly free-standing bridge
62.1a Offset side surface section, in particular flat stopping surface
62.2 Side surface
63 Base member
64 Form-locking contour
64.1 Individual tooth
64.1a Outer radial surface section
64.1b Shoulder or radial surface section
64.2 Edge or outer radial bottom ledge
65 Centering means
66 Top side, in particular sliding surface
67 recess
68 Bottom side
69 Notch
69.1 Inner surface section
80 Snap ring
100 Mount device
101 Support system
102 (First) support
H Height of the stopping device
HE Horizontal plane
H1 Height of the form-locking contour of the stopping device
R Axis of rotation
RE Radial plane
α Arc extension or peripheral angle

What is claimed is:

1. A rotatable connection for a mount device for placement in an operating room, the connection comprising an adaptable stopping mechanism that is disposed between a first connection component and a second connection component that is mounted on an axis of rotation and is rotatable relative to the first connection component, wherein the adaptable stopping mechanism comprises:
   a rotation lock that is disposed at the first connection component non-rotatingly;
   a coupling part that is disposed non-rotatingly at the second connection component and that comprises a form-locking contour for establishing individual rotational angle positions, the form-locking contour including at least one notch positioned radially inwardly,
   wherein the adaptable stopping mechanism comprises at least one stopping device with an integral stop,
   wherein the integral stop is formed by a bridge with side surface sections that are offset inward in the peripheral direction and/or by side surfaces of a base member,
   wherein the stopping device comprises a form-locking contour that corresponds to the form-locking contour of the coupling part, the stopping device contour allowing the stopping device to be non-rotatingly positioned at the coupling part in at least two different rotational angle positions in such a way that the integral stop is adapted to cooperate with the rotation lock and to establish different rotational angles or rotation ranges.

2. The rotatable connection according to claim 1, wherein the stopping device is designed as a fixing element including a fixing block, wherein the fixing element shifts in the axial direction along the axis of rotation.

3. The rotatable connection according to claim 1, wherein the stopping device is formed by the base member, wherein the integral stop is formed at a side surface of the base member and/or in a recess of the base member.

4. The rotatable connection according to claim 3, wherein the base member has an arc-shaped geometry that includes an arc-shaped inner surface and/or an arc-shaped outer surface.

5. The rotatable connection according to claim 4, wherein the base member is designed as a circular ring segment which is symmetrical relative to a radial plane that runs centrally through the base member.

6. The radial connection according to claim 1, wherein the stopping device has an extension corresponding to an arc in the range of 5° to 50° or of 10° to 40° or of 15° to 30° about the axis of rotation in the peripheral direction of the coupling part.

7. The rotatable connection according to claim 1, wherein the form-locking contour of the coupling part is designed on a shell surface that faces inward and/or on a top side of the coupling part pointing in the axial direction, and that the form-locking contour of the stopping device is designed on a bottom side that points in the axial direction toward the coupling part.

8. The rotatable connection according to claim 1, wherein the form-locking contour of the stopping device is formed by at least one notch that connects an outer surface with a bottom side of the stopping device and that is disposed at a distance to opposing side surfaces of the stopping device.

9. The rotatable connection according to claim 1, wherein the form-locking contour of the stopping device is formed by teeth including one or two teeth, wherein the teeth are preferably disposed at two opposing side surfaces or define the side surfaces at least in sections.

10. The rotatable connection according to claim 1, wherein the stopping device has a T-shaped cross sectional profile in a section in a horizontal plane orthogonal to the axis of rotation at a bottom section and at a bottom side, and/or that the stopping device comprises two recesses that define a bridge therebetween, wherein the bridge is disposed centrally relative to the peripheral direction and radially inward.

11. The rotatable connection according to claim 1, wherein the rotatable connection comprises a stopping ring that is mounted rotationally blockable at the first connection component and that has at least one stop that corresponds to the integral stop, wherein the at least one stop axially overlaps the integral stop.

12. The rotatable connection according to claim 11, wherein the rotatable connection comprises at least two stopping devices, wherein the stopping ring is axially positioned at the coupling part or at the second connection component in the axial direction using the stopping device, wherein the stopping ring and the stopping device form a sliding bearing for sliding motion relative to one another.

13. A support system for the mount device for arrangement in the operating room and for positioning a medical device in the operating room according to claim 1, comprising the rotatable connection and the first connection component in a form of a spindle, and the second connection component in a form of a sleeve.

14. The mount device for arrangement in the operating room and for positioning a medical device in the operating room according to claim 1, comprising the rotatable connection.

15. A rotatable connection for a mount device for placement in an operating room, the connection comprising an adaptable stopping mechanism that is disposed between a first connection component and a second connection component that is mounted on an axis of rotation and is rotatable relative to the first connection component, wherein the adaptable stopping mechanism comprises:
    a rotation lock that is disposed at the first connection component non-rotatingly;
    a coupling part that is disposed non-rotatingly at the second connection component and that comprises a form-locking contour for establishing individual rotational angle positions,
    wherein the adaptable stopping mechanism comprises at least one stopping device with an integral stop,
    wherein the integral stop is formed by a bridge with side surface sections that are offset inward in the peripheral direction and/or by side surfaces of a base member,
    wherein the stopping device comprises a form-locking contour that corresponds to the form-locking contour of the coupling part, the stopping device contour allowing the stopping device to be non-rotatingly positioned at the coupling part in at least two different rotational angle positions in such a way that the integral stop is adapted to cooperate with the rotation lock and to establish different rotational angles or rotation ranges, and
    wherein the form-locking contour of the stopping device is formed by at least one notch that connects an outer surface with a bottom side of the stopping device and that is disposed at a distance to opposing side surfaces of the stopping device.

16. A rotatable connection for a mount device for placement in an operating room, the connection comprising an adaptable stopping mechanism that is disposed between a first connection component and a second connection component that is mounted on an axis of rotation and is rotatable relative to the first connection component, wherein the adaptable stopping mechanism comprises:
    a rotation lock that is disposed at the first connection component non-rotatingly;
    a coupling part that is disposed non-rotatingly at the second connection component and that comprises a form-locking contour for establishing individual rotational angle positions,
    wherein the adaptable stopping mechanism comprises at least one stopping device with an integral stop, and
    wherein the stopping device comprises a form-locking contour that corresponds to the form-locking contour of the coupling part, the stopping device contour allowing the stopping device to be non-rotatingly positioned at the coupling part in at least two different rotational angle positions in such a way that the integral stop is adapted to cooperate with the rotation lock and to establish different rotational angles or rotation ranges, and
    wherein the stopping device has a T-shaped cross sectional profile in a section in a horizontal plane orthogonal to the axis of rotation at a bottom section and at a bottom side, and/or that the stopping device comprises two recesses that define a bridge therebetween, wherein the bridge is disposed centrally relative to the peripheral direction and radially inward.

17. A rotatable connection for a mount device for placement in an operating room, the connection comprising an adaptable stopping mechanism that is disposed between a first connection component and a second connection component that is mounted on an axis of rotation and is rotatable relative to the first connection component, wherein the adaptable stopping mechanism comprises:
    a rotation lock that is disposed at the first connection component non-rotatingly;
    a coupling part that is disposed non-rotatingly at the second connection component and that comprises a form-locking contour for establishing individual rotational angle positions,
    wherein the adaptable stopping mechanism comprises at least one stopping device with an integral stop,
    wherein the stopping device comprises a form-locking contour that corresponds to the form-locking contour of the coupling part, the stopping device contour allowing the stopping device to be non-rotatingly positioned at the coupling part in at least two different rotational angle positions in such a way that the integral stop is adapted to cooperate with the rotation lock and to establish different rotational angles or rotation ranges, and
    further comprising comprises a stopping ring that is mounted rotationally blockable at the first connection component and that has at least one stop that corresponds to the integral stop, wherein the at least one stop axially overlaps the integral stop.

18. The rotatable connection of claim 17, wherein the rotatable connection comprises at least two stopping devices, wherein the stopping ring is axially positioned at the coupling part or at the second connection component in the axial direction using the stopping device, wherein the stopping ring and the stopping device form a sliding bearing for sliding motion relative to one another.

* * * * *